United States Patent

[11] 3,589,187

| [72] | Inventor | Jacob Howard Beck |
| --- | --- | --- |
|  |  | Waban, Mass. |
| [21] | Appl. No. | 726,475 |
| [22] | Filed | May 3, 1968 |
| [45] | Patented | June 29, 1971 |
| [73] | Assignee | BTU Engineering Corporation |
|  |  | Waltham, Mass. |

[54] DRAFT MEASURING DEVICE
9 Claims, 5 Drawing Figs.

| [52] | U.S. Cl. | 73/204 |
| --- | --- | --- |
| [51] | Int. Cl. | G01f 1/00 |
| [50] | Field of Search | 73/194, 204 |

[56] References Cited
UNITED STATES PATENTS
1,987,642  1/1935  Schueler.................... 73/204 X FOREIGN PATENTS
174,338  2/1923  Great Britain................ 73/204

*Primary Examiner*—Richard C. Queisser
*Assistant Examiner*—John P. Beauchamp
*Attorney*—Nicholas A. Pandiscio ABSTRACT: A system and method for measuring the rate of draft within a furnace muffle consisting of a first thermocouple mounted within the muffle and exposed to said draft, a second thermocouple mounted immediately adjacent the muffle but not exposed to said draft, and an indicating device coupled and responsive to the difference between the E.M.F. outputs of the two thermocouples.

PATENTED JUN 29 1971　　3,589,187

J. HOWARD BECK
INVENTOR.

BY Nicholas A. Pandiscio

ATTORNEY.

DRAFT MEASURING DEVICE

This invention relates to furnaces, and more particularly to a device for measuring the draft or rate of flow of a gas atmosphere through the muffle of a furnace.

Muffle furnaces are employed in the manufacture of many different products where heating or sintering in the presence of a selected gas atmosphere is required, e.g., in the manufacture of semiconductor components or modules. In any such application, control of muffle temperature and the rate of draft of the gas atmosphere is critical to the quality of the product being processed. A prime example is the formation of thick film printed circuit elements. The degree of oxidation or reduction, as the case may be, of a thick film deposit on a substrate is critically related to temperature. The chemical reactions which determine the final composition (and hence the physical characteristics) of such films proceed at a rate which approximately doubles for every 10° F. rise in temperature. The degree of oxidation or reduction of the thick film is also critically related to the composition and rate of draft of the gas atmosphere. Thus, obtaining accurate measurement and control of the draft is necessary so that the conditions within the muffle can be repeated as desired, to insure a product of uniform and predictable properties.

Heretofore, the devices used for measuring draft have, in general, been based upon the principle that the electrical resistance of a heated wire depends upon the temperature of the wire. In one draft-measuring means based upon this "hot wire" principle, a heated wire is positioned in a furnace muffle so as to be exposed to the draft therein and the change in electrical resistance caused by changes in the rate of heat flow from the wire to the gas is used as a measure of the draft. However, this type of measuring system suffers from the limitation that it is affected in varying amounts by both the draft and the temperature within the muffle. Another typical draft-measuring means utilizes two thermocouples, one in the muffle exposed to the draft and the other located outside the muffle in a region having a fixed temperature, e.g. an ice bath. The difference in E.M.F. between the two sensors provides a measure of the draft. However, this system also is affected by both draft and the temperature and hence it will not give an accurate determination of the draft.

Accordingly, the principal object of the present invention is to provide a means for overcoming the above limitations, substantially by eliminating the effect of temperature.

Another object is to provide an improved means for obtaining an analog electrical signal which varies closely with the rate of draft within a furnace muffle, and means responsive to said signal for indicating the rate of draft.

A more specific object is to provide a draft measuring system utilizing a pair of temperature-sensitive devices which are arranged and connected so as to coact to provide an electrical signal which varies in accordance with changes in the rate of draft within the muffle.

The above and other objects are achieved by a device comprising a pair of voltage-generating temperature sensors, the first sensor being disposed within the muffle in such a manner that it lies in the direct path of the draft, while the second sensor is located without the muffle but immediately adjacent thereto so as to measure the muffle temperature without being affected by the draft. With the muffle heated to the desired temperature under the condition of zero draft, the temperature difference between the two sensors is small. Surprisingly and significantly, this temperature difference—and hence the difference in E.M.F. of the sensors—remains substantially constant over a wide range of temperature. Accordingly, any change in the difference in E.M.F. of the two sensors will be due solely to the presence of the draft. When a draft passes through the muffle, it will alter the temperature of the sensor within the muffle. An increase in draft will cause the sensor in the muffle to drop in temperature and this temperature drop in turn will cause a decrease in the sensor's E.M.F. output. However the draft will have no effect on the other sensor. Accordingly, the difference in the E.M.F. outputs of the two sensors will increase. By applying the differential output of the two sensors to a suitable voltmeter calibrated so as to give readings in units of draft, a direct measurement of the rate of flow can be accurately and easily obtained.

A fuller understanding of the nature and objects of the present invention is provided by the following detailed description which is to be read in connection with the accompanying drawings, wherein.

Figure 1:
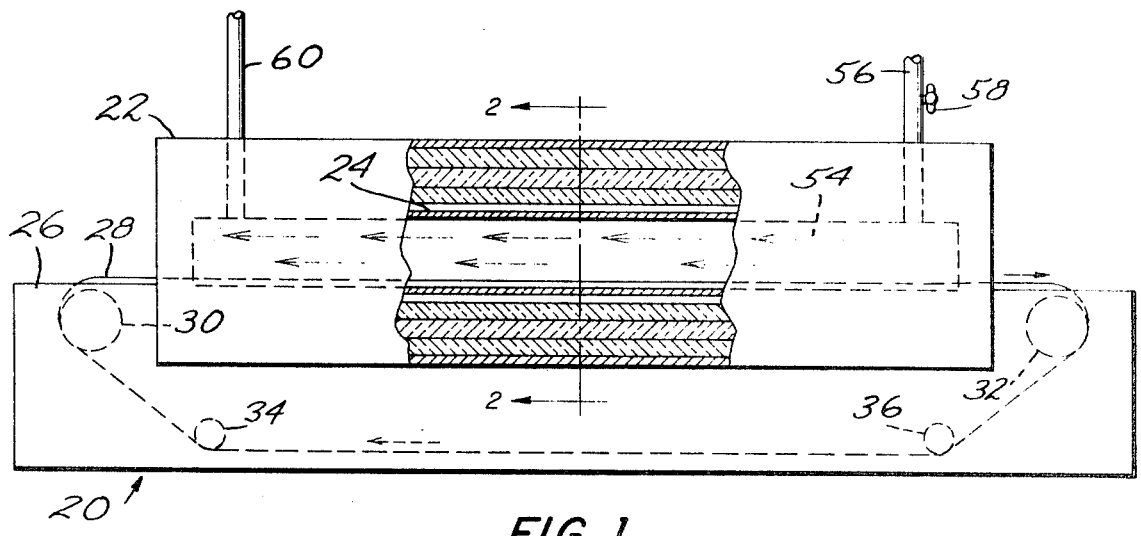
FIG. 1 is a longitudinal view, partially broken away, of a typical furnace used with the present invention.
Figure 2:
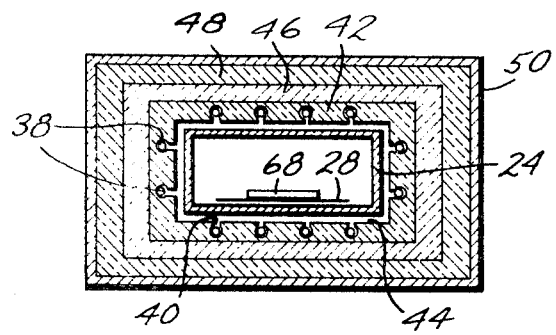
FIG. 2 is a cross-sectional view taken along lines 2-2 of FIG. 1.

Referring to FIG. 1 there is shown a continuous furnace 20 of a type commonly employed in the manufacture of thick film semiconductor components and modules. The furnace comprises a heating section 22 which includes an elongate longitudinally extending muffle 24. The heating section is supported on a frame 26 which also supports an endless conveyor belt 28, preferably made of wire mesh capable of withstanding large changes in temperature. The latter is mounted for movement on a plurality of drums 30 and 32 and a pair of slack takeup rolls 34 and 36. One or the other of the drums is driven unidirectionally by a suitable motorized drive means having an adjustable speed control. The conveyor belt is so mounted that it has an upper run which extends through the muffle. As is customary the muffle has suitable means (not shown) for supporting the upper run of the conveyor belt so that it is substantially flat as it moves through the muffle. The muffle may have any suitable cross-sectional shape, e.g., round, half round, square or rectangular. In the usual case the muffle is made of fused quartz or a heat resistant nickel chromium alloy. Surrounding the muffle (FIG. 2) are a plurality of heating elements 38. These preferably are of the electrical resistance type well known in the art. The heating elements 38 are mounted within suitable openings 40 formed within an inner insulating layer 42 of mullite bricks or similar material. The thickness of layer 42 and the contour of openings 40 is such that the heat from heaters 38 will communicate with a continuous radiation zone 44 which surrounds the muffle and lies between inner layer 42 and the muffle. This radiation zone typically is less than about 3—4 inches. Typically, there is also provided a second insulating layer 46 which surrounds inner layer 42. Preferably, layer 46 is of a diatomaceous earth such as diatomite or similar material. An outer insulating layer 48 of asbestos or the like material may also be provided about layer 46. A shell or jacket 50 encloses the furnace, and is preferably formed of aluminum, low-carbon steel or the like. The electrical power leads (not shown) for the heaters 38 are brought out through layers 42, 46 and 48 and jacket 50 to a suitable power source via conventional controls (both not shown) for switching and varying the amount of power supplied to the heaters.

A gas atmosphere or draft (direction of flow indicated by the arrows 54) is caused to pass through the muffle, preferably counter to the direction in which the product is transported through the muffle. As such, clean, unreacted gas is always drawn over the product. Depending upon the composition of the gas atmosphere, the draft may be induced by inclining the muffle at about a 2° pitch, with the product-entrance end high. The chimney effect of this tilt induces a slow and constant-velocity laminar flow of gas. Alternately the gas may be force fed under pressure. Depending upon the mature nature the heat treatment and the desired properties of the product being processed, one or more gases may be introduced to the muffle in the same or different regions thereof. Typically, when using a closely controlled atmosphere, the furnace muffle is disposed horizontally and the gas atmosphere is introduced near the product-exit end such as through an inlet pipe 56 fitted with a flow control valve 58. The gas atmosphere is withdrawn by means of one or more venturis or exhausts 60 located near the product-entrance of the muffle. Suitable gas curtains or equivalent means (not shown) are usually disposed at both ends of the muffle to prevent loss of heat or gas atmosphere without at the same time interfering with movement of the product into and out of the muffle.

Figure 3:
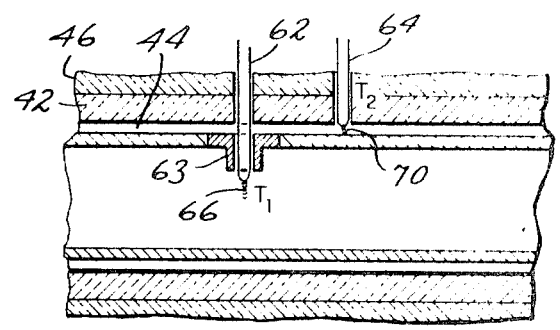
FIG. 3 shows a preferred way of mounting the thermocouples.
Figure 4:
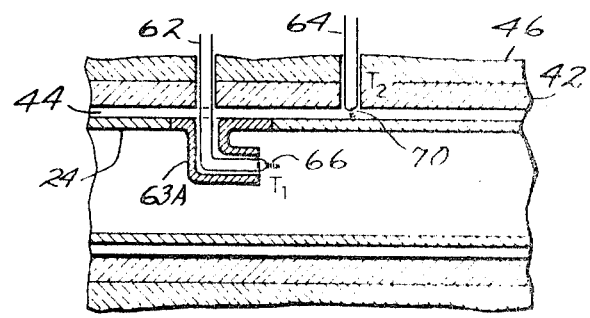
FIG. 4 shows an alternative way of mounting the thermocouples.

Referring now to FIGS. 3 and 4, there is shown a pair of heat sensitive sensors in the form of thermocouples 62 and 64. These may be comprised of wires of Chromel-Alumel, Platinum-Platinum Rhodium, or other high-temperature metals and/or alloys which are well known in the art and used for thermocouples. In FIG. 3, thermocouple 62 extends into the muffle through its upper wall and is oriented substantially vertically, i.e., at a right angle to the direction of the draft. A jacket 63 is provided to support that portion of the thermocouple within the muffle. Preferably, this jacket is of the same material as the muffle. The "hot" junction 66 of thermocouple 62 is preferably immediately above the product, shown at 68, supported by the conveyor. The hot junction 66 is not shielded so that it is affected both by the temperature $T_1$ within the muffle and the cooling effect of the draft in the muffle. The other thermocouple 64 is outside the muffle and is disposed so that its temperature-sensitive junction 70 is immediately adjacent to heaters 38 or, preferably, within radiation zone 44, and is at the same temperature $T_2$ as the walls of the muffle. However, it is not exposed to any cooling effect by the draft.

FIG. 4 is similar except that thermocouple 62 is disposed substantially horizontal within the muffle, i.e., parallel to the draft and is supported by a right angle jacket 63A. The second thermocouple 64 is again disposed outside of the muffle.

Extensive testing has indicted that if the depth of the radiation zone is not too great, i.e., not more than 3—4 inches from the muffle, the temperature difference $(T_2-T_1)$ between the radiation zone of the heaters and the muffle is insignificant compared to the actual muffle temperature, e.g., at a muffle temperature of 700° C., the temperature difference $(T_2-T_1)$ is within about 2 percent or 13° C. Testing has also shown that this temperature difference remains substantially constant over the temperature range normally encountered e.g., plus or minus 100° C. (providing sufficient time has elapsed so that the muffle temperature has stabilized at the predetermined temperature value). Hence at zero draft, the difference between the E.M.F. outputs of the two thermocouples also is small but constant. If thermocouple 62 is exposed to a flow of gas in the muffle, its E.M.F. output will change according to the magnitude of the draft. The difference between the outputs of E.M.F. thermocouples 62 and 64 will increase with increasing draft and will decrease with decreasing draft.

Figure 5:
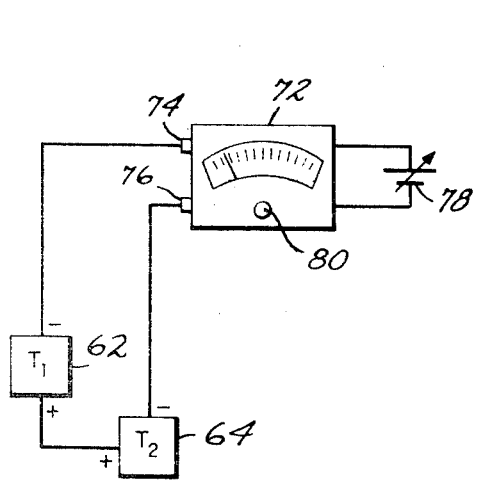
FIG. 5 shows a circuit diagram of a draft-measuring system embodying the present invention.

Referring now to FIG. 5, measurement of the draft rate is obtained by connecting the two thermocouples to a device which is sensitive to small changes in E.M.F., such as a voltmeter 72. The positive polarity leads of the two thermocouples are connected to one another, while their negative polarity leads are coupled to the voltmeter, at terminals 74 and 76. In this manner, the E.M.F. outputs of the two thermocouples buck each other and provide a difference signal which drives the voltmeter. As a result the meter provided a value indication of the difference signal.

The invention further contemplates provision of means for reducing or eliminating the effect of the zero draft difference in E.M.F. on the meter when a draft exists in the muffle. Such means may comprise an adjustable voltage source, e.g., an adjustable battery 78 connected across the terminals of the meter so as to buck and cancel out the zero draft difference in E.M.F. Alternately it is possible to employ a meter having an internal mechanical zeroing means operated by an external knob 80, the zeroing means being adapted to shift the meter's needle back to zero position from the position determined by the zero draft difference in E.M.F.

Of course, the meter's dial may be calibrated in appropriate units of draft, e.g., inches/second so that no interpolation is required to be made by the observer to determine the magnitude of the draft.

It should be noted that the thermocouple within the muffle can be disposed at any angle, providing its "hot" junction is positioned so as to lie in the path of the draft. The two temperature sensors, e.g., thermocouples 62 and 64 may be replaced by a plurality or pile of temperature sensors, connected together in series. Where more than one sensor is used, they may be located at spaced points so as to average out any differences in muffle temperature.

It also is contemplated that the meter may be of the type adapted to provide a digital display in response to the analog DC voltage difference between the thermocouples 62 and 64 and also that the meter circuit may be connected so as to drive means for automatically adjusting the rate of draft so as to hold it at a predetermined value.

Another obvious modification is to provide a shell about the temperature sensor 62 that completely envelopes it and thus protects it from direct contact with the draft where the latter comprises a gas that may react with or cause rapid deterioration of the sensor, yet does not materially affect the rate of heat exchange between the sensor and the draft. In such case the sensor may be said to be "thermally exposed" to the draft.

This invention constitutes a substantial improvement over the prior art. It is relatively inexpensive and easy to practice. It provides a continuous indication of draft. The indicating device, e.g., voltmeter, employed to provide a visible indication need have a calibration tolerance of no more than 1—2 percent. The measurement is accurate since the temperature difference between the two sensors at zero draft is small, remains relatively consistent over a relatively wide range of temperature and is easily eliminated by zeroing the indicating device.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In combination with a furnace comprising an elongate horizontally extending hollow muffle defining a chamber in which flows a gaseous atmosphere, insulation means surrounding said muffle for insulating said muffle from the ambient atmosphere, and a source of heat disposed between said muffle and said insulation means, a device for measuring the rate of flow of said gaseous atmosphere, said device comprising:

a first temperature-sensitive means adapted to provide an electrical signal varying in accordance with the temperature thereof, said first temperature-sensitive means being mounted so as to extend within said chamber in thermal exposure to said muffle and said gaseous atmosphere;

a second temperature-sensitive means adapted to provide an electrical signal varying in accordance with the temperature thereof, said second temperature-sensitive means being mounted between said insulation and said muffle so as to be at substantially the same temperature as said muffle; and indicating means coupled to said first and second temperature-sensitive means for providing a measure of said rate of flow in response to the electrical signals produced by said first and second means.

2. The device of claim 1 wherein said electrical signals are voltage signals.

3. The device of claim 1 wherein said first and said second temperature-sensitive means comprise thermocouples.

4. The device of claim 1 wherein said first and second temperature-sensitive means provide DC signals and further wherein said first and second temperature-sensitive means are connected so that said DC signals buck each other.

5. The device of claim 1 further including means for zeroing said indicating means when said rate of flow is zero.

6. The device of claim 5 wherein said zeroing means provides another signal that is applied to said indicating means in bucking relation to the difference between said electrical signals, and further wherein said zeroing means is adjustable so that said another signal may be made equal to said difference when said draft is zero.

7. The device of claim 1 wherein said muffle is made of a material which is relatively transparent to infrared radiation so that any change in temperature within said muffle is substantially instantaneously sensed by said second means.

8. The device of claim 7 wherein said muffle is made of fused quartz.

9. The device of claim 7 wherein said muffle is made of a nickel chromium alloy.